United States Patent
Fields

[11] Patent Number: 5,123,689
[45] Date of Patent: Jun. 23, 1992

[54] SANDWICH SPATULA

[76] Inventor: Linda Fields, 10 Wyckoff Way, Somerville, N.J. 08876

[21] Appl. No.: 624,697

[22] Filed: Dec. 6, 1990

[51] Int. Cl.$^5$ .............................................. A47J 43/28
[52] U.S. Cl. ..................... 294/26.5; 294/50; 294/99.2; 30/128
[58] Field of Search ................ 294/7, 8, 9, 10, 26.5, 294/50, 99.2, 50.5; 30/128; 269/13, 14, 909; 206/804

[56] References Cited

U.S. PATENT DOCUMENTS

| | | | |
|---|---|---|---|
| 1,798,490 | 3/1931 | Parr | 30/128 X |
| 3,342,518 | 9/1967 | Gorton, Jr. | 294/99.2 |
| 3,481,458 | 12/1969 | Mayeaux | 206/527 |
| 4,569,130 | 2/1986 | Koller et al. | 294/7 X |
| 4,589,553 | 5/1986 | Ferrero | 206/525 |
| 4,729,589 | 3/1988 | Puskar | 294/7 X |

FOREIGN PATENT DOCUMENTS 7942 of 1889 United Kingdom .............. 294/99.2

*Primary Examiner*—Margaret A. Focarino
*Assistant Examiner*—Dean J. Kramer
*Attorney, Agent, or Firm*—Klauber & Jackson

[57] ABSTRACT

Apparatus for inserting a sandwich into a receptacle, includes a first square plate; a second square plate; a substantially U-shaped connecting section having free ends connected to respective edges of said first and second plates so as to maintain the first and second plates in a substantially parallel, spaced relation, while permitting movement of the first and second plates toward and away from each other; an ejector device for ejecting a sandwich from between the first and second plates, the ejector device including an ejector plate positioned between the first and second plates, the ejector plate having a width substantially equal to that of the first and second plates and a height substantially equal to that of a sandwich to be ejected from therebetween, an elongated leg extending from the ejector plate, a peg extending through a slot in one arm of the connecting section and a button connected to the opposite end of the peg so as to slidably retain the peg in the slot in the connecting section in order to cause the ejector plate to eject the sandwich from between the first and second plates, and a slot in the first plate to permit cutting of the sandwich positioned between the first and second plates.

15 Claims, 4 Drawing Sheets

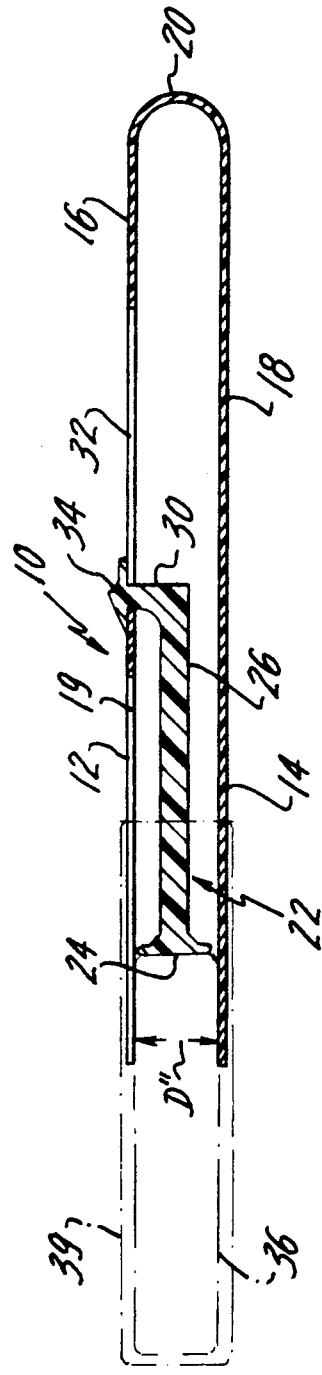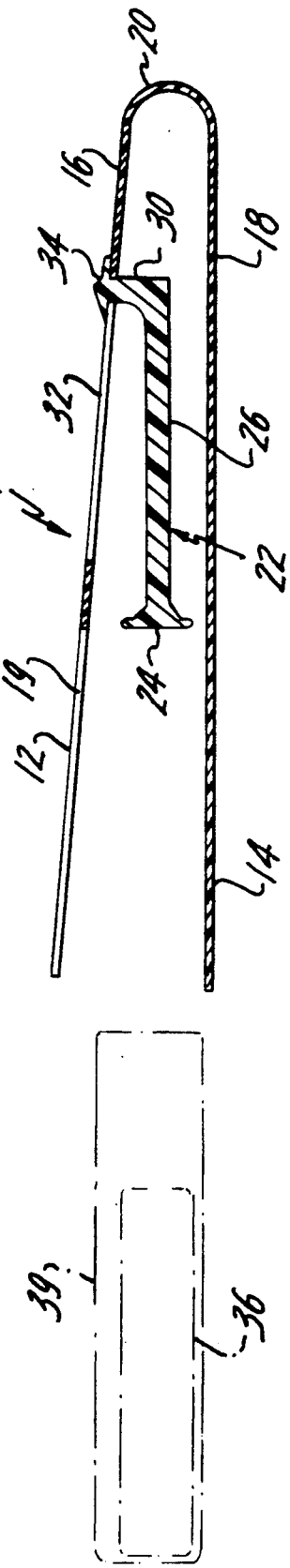

SANDWICH SPATULA

BACKGROUND OF THE INVENTION

The present invention relates generally to an apparatus for holding sandwiches together while slicing and inserting them into receptacles such as plastic sandwich bags or vending machine slots.

Sandwiches are a well-known form of food generally comprising two layers of brad having between them an edible filling, such as cheese, tuna fish, meat or the like. Although sandwiches may have a variety of shapes and sizes, certain preparative activities are common to most sandwiches. For example, most sandwiches are sliced into smaller segments, such as halves or quarters, for ease of handling when eating the same. Typically, a sandwich must be compressed during slicing or else it tends to fall apart. Additionally, a common problem in handling a sandwich once it has been assembled is that the contents may tend to fall out from between the pieces of bread, especially when attempting to put the sandwich in a plastic sandwich bag. Therefore, slicing and packaging a sandwich are activities which may cause the sandwich to fall apart.

Further, in a commercial setting, the assembler must use his hands to compress the sandwich for slicing it and while moving it to a plate, container or surface, thus making hygiene a real concern. Since food handling is a common source of food contamination, many customers feel more comfortable in the knowledge that their food has been contacted as little as possible by the hands of the sandwich assembler.

There are a variety of known sandwich holders for use while consuming a sandwich. For example, Rossi U.S. Pat. No. 2,444,116; Wood U.S. Pat. No. 3,355,082; Siemak U.S. Pat. No. 4,511,039; and Ferrero U.S. Pat. No 4,589,553, all disclose sandwich holders for use by the consumer. Essentially, the disclosed sandwich holders comprise opposing holder arms or paddles which are joined at a flexible central portion. The holder arms or paddles may be compressed together to hold a sandwich between them while it is being consumed. However, most of the sandwich holders disclosed in the above-named patents have no mechanism for exposing successively lower portions of a sandwich held therebetween without physically contacting the sandwich The sandwich holder disclosed in the Wood patent suffers from a slightly different disadvantage by requiring that lower portions of a sandwich be successively exposed by folding down portions of the holder arms or paddles. Therefore, the Wood sandwich holder cannot be repeatedly used thereafter.

None of the sandwich holders of the above-referenced patents provide ejection means for ejecting a sandwich from between the holder arms or paddles. In this regard, Mayeaux U.S. Pat. No. 3,481,458 provides a strip which can be moved outwardly by rotating a threaded handle which pushes the sandwich out of the resilient rectangularly shaped cup-like container. However, the Mayeaux sandwich holder suffers from numerous other disadvantages. This includes the fact that the construction of the Mayeaux holder severely limits the size and shape of sandwich with which the holder may be used. Moreover, the Mayeaux sandwich holder is incapable of compressing a sandwich on both sides while it is being sliced and for subsequent insertion of the sliced sandwich into a plastic bag. Further, use of the Mayeaux device is cumbersome.

Puskar U.S. Pat. No. 4,729,589 to discloses a device for inserting filling into a taco shell which essentially comprises a scoop with an elongated plunger portion for pushing a meat filling off the scoop and into a taco shell. This device is merely of interest in that it relates to a mechanism for pushing food off of a holder. However, this device is not adaptable for use with sandwiches since there is no means for holding a sandwich together. Nor is there any provision for compressing and slicing a sandwich held therein.

As such, there are no known devices for handling a sandwich immediately after its assembly and up to its packaging. It is frequently very difficult to slide a sandwich into a plastic bag without losing some of the contents from between the slices of bread of the sandwich, particularly when the sandwich has been cut or sliced. Another difficulty is removing one's hand from underneath the sandwich, when inserting it into a plastic bag, without having the sandwich fall apart. Similar problems can be observed when attempting to place sandwiches in other narrow receptacles, for example, loading slots in vending machines and automats.

For purposes of hygiene and packaging ease, it is important that a sandwich holder be developed for handling of a sandwich in a commercial setting prior to its reaching the consumer. Such a sandwich holder should address those operations from the time the sandwich has been assembled to the time it is packaged. More particularly, a sandwich must be compressed from both sides to prevent loss of the filling material between the bread slices during slicing and packaging. Additionally, there must be a way to insert the sandwich into a receptacle and then remove the device without disturbing the sandwich. No previously known device is suitable for this task.

OBJECTS AND SUMMARY OF THE INVENTION

It is therefore an object of the present invention to provide a device for compressing a sandwich from both sides for convenient transportation of the sandwich without loss of the filling material.

Another object of the present invention is to provide a device which can be used to insert a sandwich into a receptacle such as a plastic bag, and subsequently withdraw the device without disturbing the sandwich.

Still another object of the present invention is to provide a device which reduces the need for actual physical contact between the sandwich and the assembler's hands upon completion of the sandwich.

Yet another object of the present invention is to provide a means by which a sandwich may be ejected from a handling spatula onto a desired surface.

A further object of the present invention is to provide a device which can compress a sandwich for ease of slicing the sandwich into sections.

Still a further object of the present invention is to allow the slicing of a sandwich and subsequent transportation of the sliced portions without fear of the sandwich portions falling apart.

The present invention relates to a device which comprises a handle having a first elongated arm and a second elongated arm pivotally attached to the first elongated arm. The first arm and the second arm are maintained in a substantially parallel relationship with one another and are resiliently deflectable towards one another. A plate extends from the end of each of the arms, the plates being substantially opposite and coplanar with one another.

The plates are maintained at a distance from one another that would approximate the thickness of a sandwich. This distance could be maintained by having the arms attached to one another by a hinge which is spring-loaded or by actually being integrally connected with one another at a U-shaped junction having a predetermined resilience.

The sandwich holder of the present invention is also provided with ejector means for ejecting a sandwich from between the first and second plates. The ejector means is usually incorporated into one or the other of the arms. The ejector means includes a plunger having an end blade with a height approximately equal to the distance between the plates when they are holding a sandwich and having a length extending the entire transverse surface of the plates. The plunger is adapted to reciprocate along the spatula by means of a button disposed along the outer edge of the arm supporting the plunger.

A slot may be provided in one or both of the plates to allow a consumer to slice the sandwich using the spatula. The user would compress the sandwich and then slip a knife through the slot, cutting down through the sandwich being held between the plates. The plates and the sandwich would then inserted into a plastic bag, or like sandwich receptacle. The user would then actuate the plunger, pushing the sandwich forward while withdrawing the plates from the receptacle, so that the plunger maintains the sandwich within the bag while the device is withdrawn. It can be seen that in a commercial setting, a sandwich can be sliced with little or no physical contact with the assembler's hands and that the completed sandwich may be moved onto a plate, a vending slot, or the like without additional physical contact by the assembler.

BRIEF DESCRIPTION OF THE DRAWINGS

For a more complete understanding of the present invention, reference may be had to the following detailed description considered in conjunction with the accompanying drawings in which:

FIG. 4 is a perspective view similar to FIG. 2, illustrating a first step in operating the sandwich spatula of FIG. 1;

FIG. 5 is a perspective view similar to FIG. 2, illustrating the end of operation of inserting a sandwich in a plastic bag with the sandwich spatula of FIG. 1;

DETAILED DESCRIPTION OF THE PREFERRED EMBODIMENTS

Figure 1:
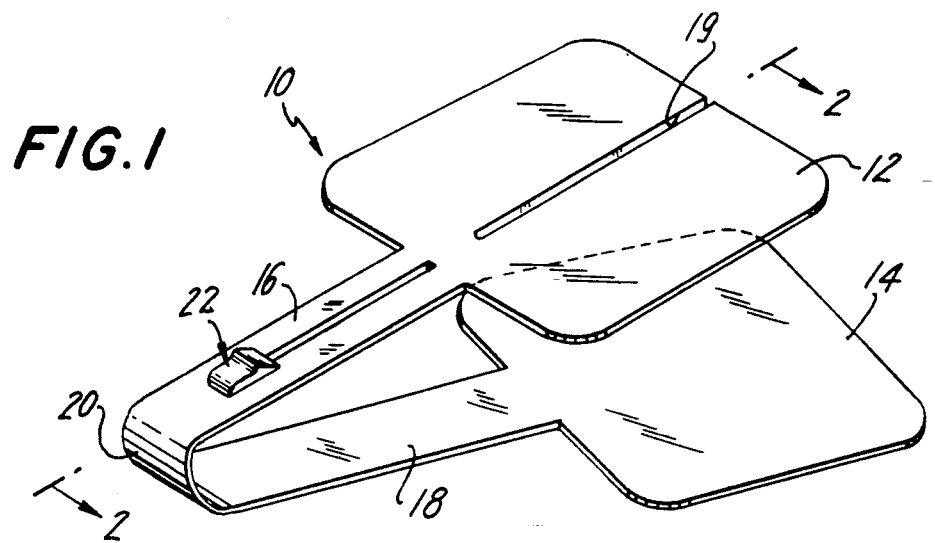
FIG. 1 is a perspective view of a sandwich spatula constructed in accordance with one exemplary embodiment of the present invention.
Figure 2:
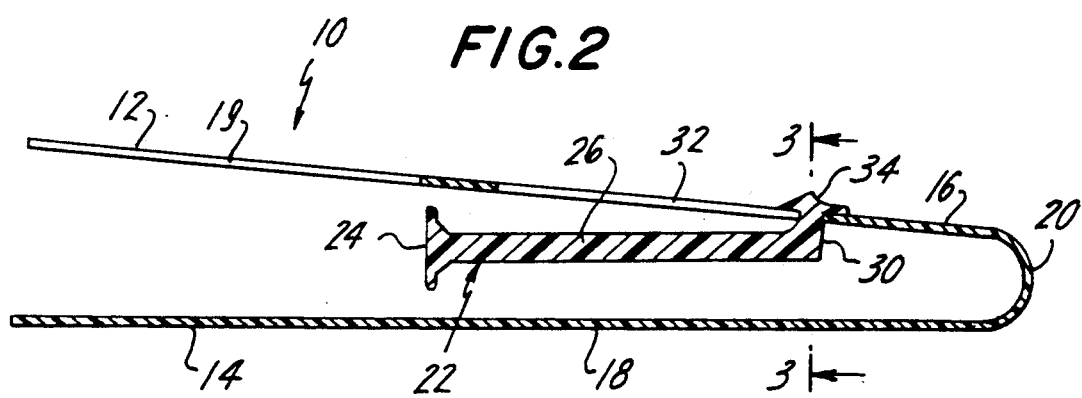
FIG. 2 is a cross-sectional view of the sandwich spatula illustrated in FIG. 1, taken along line 2—2 thereof.
Figure 3:
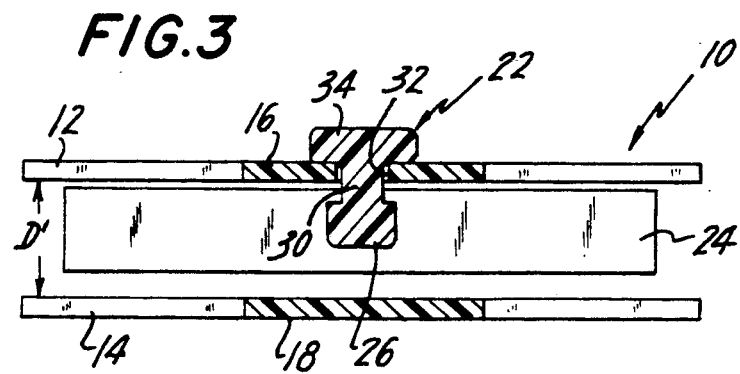
FIG. 3 is a cross-sectional view of the sandwich spatula illustrated in FIG. 2, taken along line 3—3 thereof.

Referring now to FIGS. 1-3, a sandwich spatula 10 constructed in accordance with the present invention comprises a square upper plate 12 and a square lower plate 14, plates 12 and 14 having substantially the same dimensions. The dimensions are determined in accordance with the particular type of sandwich with which sandwich spatula 10 is intended to be used, although plates 12 and 14 may be dimensioned to cover a plurality of different sized and shaped sandwiches. Upper plate 12 is integral with, or connected by any conventional means to, an upper arm 16, and lower plate 14 is similarly integral with or connected to a lower arm 18. Upper plate 12 is further provided with a centrally located slicing slot 19 which extends across substantially the entire length of upper plate 12 and through which a knife may be passed.

Upper arm 16 and lower arm 18 must be connected to each other in a manner which allows a user to move upper plate 12 and lower plate 14 towards one another from a first distance D' (FIG. 3) to a second distance D" (FIG. 4) and subsequently away from one another. This is accomplished by constructing upper arm 16 and lower arm 18 as extensions of a U-shaped connecting member 20. Connecting member 20 has a resilience sufficient to move plates 12 and 14 back to the desired position of FIGS. 1 and 2 after the removal of the external force used to compress plates 12 and 14 toward one another for grasping a sandwich. Alternatively, although not shown, arms 16 and 18 can be hinged together, with a spring biasing arms 16 and 18 apart by a preset amount and with a stop provided to limit the separation of arms 16 and 18.

A plunger mechanism 22 is provided for ejecting a sandwich from between upper plate 12 and lower plate 14. Plunger mechanism 22 is T-shaped with the top of the T constituting a rectangular ejector blade 24 approximately equal in width to upper blade 12 and lower blade 14, and having a height equal to or slightly less than the minimum desirable distance D" separating upper plate 12 and lower plate 14 when they are compressed together. Ejector blade 24 is connected to one end of a leg 26 of plunger mechanism 22, leg 26 extending along the lengthwise direction of spatula 10. A guide peg 30 is connected to the opposite end of leg 26 and extends through a guide slot 32 provided in upper arm 16, with peg 30 being of slightly smaller width than guide slot 32 to allow sliding motion therethrough. It is noted that leg 26 has a width greater than that of guide slot 32. Guide peg 30 has a broad upper button portion 34 secured to the opposite end thereof, with button portion 34 being wider than guide slot 32. Thus, leg 26 and button portion 34 straddle guide slot 32 on opposite sides thereof, so as to slidably secure plunger mechanism 22 to upper blade 12.

Referring now to FIGS. 4 and 5, in operation, a sandwich 36 is positioned on lower plate 14, and upper arm 16 is compressed towards lower arm 18, thereby pressing upper plate 12 down onto sandwich 36. If desired, a knife (not shown) is inserted into slicing slot 19 and through the sandwich compressed between plates 12 and 14 to cut the sandwich in half. Plates 12 and 14, with sandwich 36 held between them, are then inserted into a desired receptacle, such as a plastic sandwich bag 39. Some of the compressive force on upper arm 16 is then released. Then, spatula 10 is pulled from bag 39 while button portion 34 is simultaneously pressed forward by means of guide peg 30 sliding within guide slot 32, until spatula 10 has been removed from bag 39, leaving sandwich 36 intact inside bag 39, as shown in FIG. 5.

Figure 6:
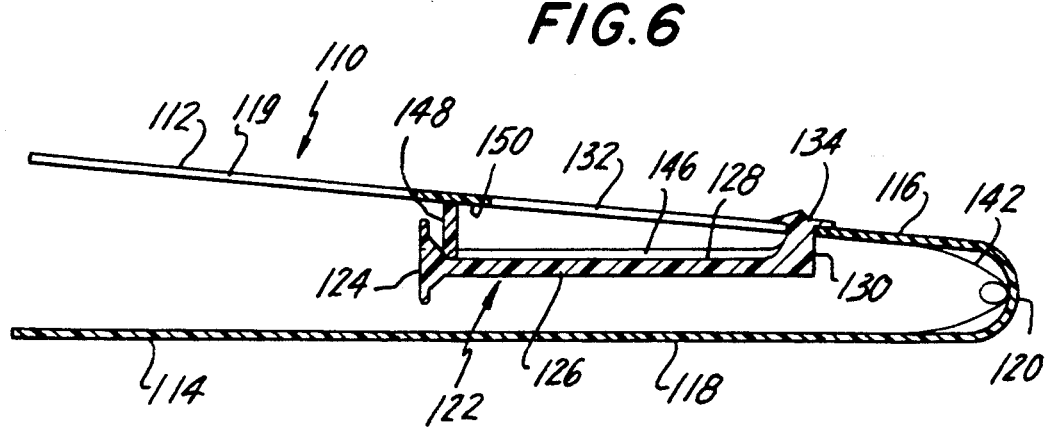
FIG. 6 is a cross-sectional view of a sandwich spatula constructed in accordance with another exemplary embodiment of the present invention.
Figure 7:
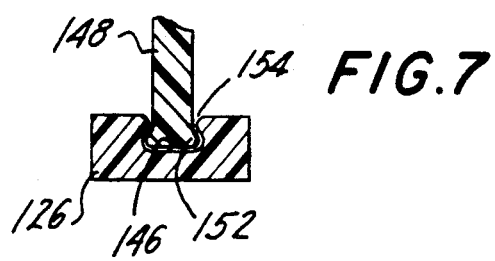
FIG. 7 is a cross-sectional view of a portion of the sandwich spatula illustrated in FIG. 6, taken along line 7—7 thereof.

Referring now to FIGS. 6 and 7, a sandwich spatula 110 according to an alternative embodiment of the present invention, will now be described in which elements corresponding to the elements described above with respect to spatula 10 of FIGS. 1–5, have been designated by corresponding reference numerals increased by 100 and a detailed description of such common elements will be omitted herein for the sake of brevity. As shown, a tension spring 142 is provided for maintaining a separating force between upper arm 116 and lower arm 118. As an additional guide, leg 126 is provided with a guide groove 146 in the upper edge 128 thereof. Guide groove 146 is sized to receive a support pin 148 provided on the underside 150 of upper arm 116 relatively proximate to upper plate 112. Specifically, support pin 148 is shaped at its lower end with an enlarged head 152 which is press fit through a narrow slot-like entranceway 154 of guide groove 146 to slidably retain enlarged head 152 within guide groove 146.

Figure 8:
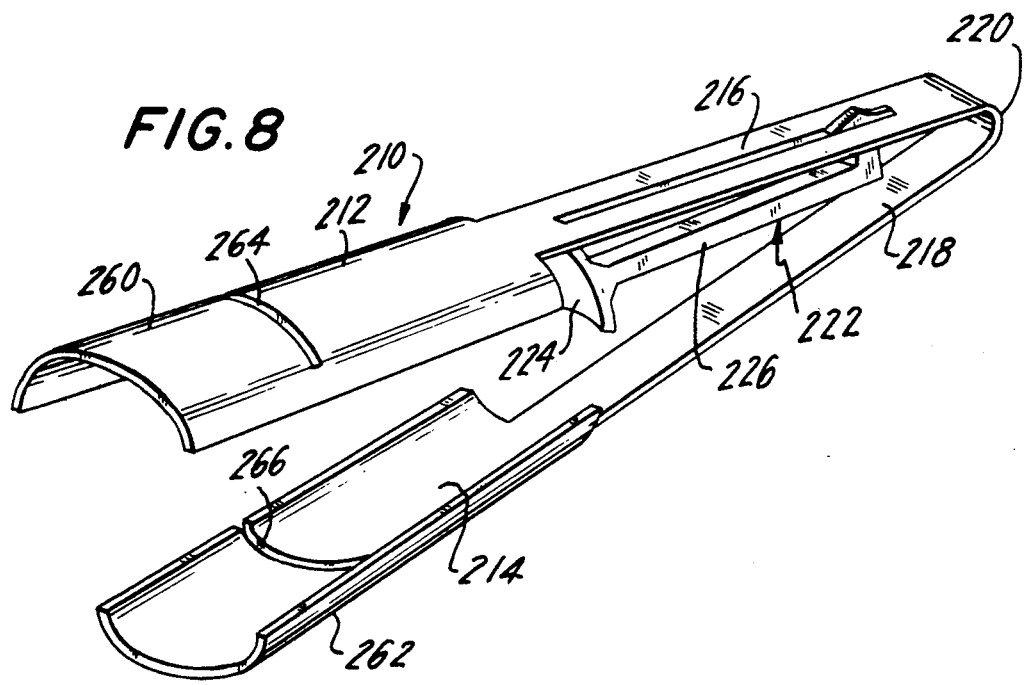
FIG. 8 is a perspective view of a sandwich spatula constructed in accordance with another embodiment of the present invention.

Referring now to FIG. 8, a sandwich spatula 210 according to another embodiment of the present invention will now be described in which elements corresponding to the elements described above with respect to spatula 10, have been designated by the same reference numerals augmented by 200, and a detailed description of such common elements will be omitted herein for the sake of brevity. Specifically, spatula 210 is provided with a curved upper plate 260 and a curved lower plate 262, specifically designed for grasping sandwiches made with French bread, Italian rolls or other cylindrically shaped breads. Curved upper plate 260 and curved lower plate 262 are provided with slots 264 and 266 a substantial portion of the way through the entire width of curved upper plate 260 and curved lower plate 262, respectively. Slots 264 and 266 allow the user, while a hero sandwich is compressed between the curved upper plate 260 and curved lower plate 262, to subsequently insert a knife into slots 264 and 266, thereby facilitating the slicing of a cumbersome sandwich, compression of which might otherwise result in the sandwich's contents falling out. The plunger mechanism 222 is provided with an ejector cup 224 at the end of plunger leg 226 which, like ejector blade 24, pushes against the rounded end of a hero sandwich, thereby ejecting the sandwich from between curved plates 260 and 262 and into a suitable receptacle without the hero sandwich falling apart.

Figure 9:
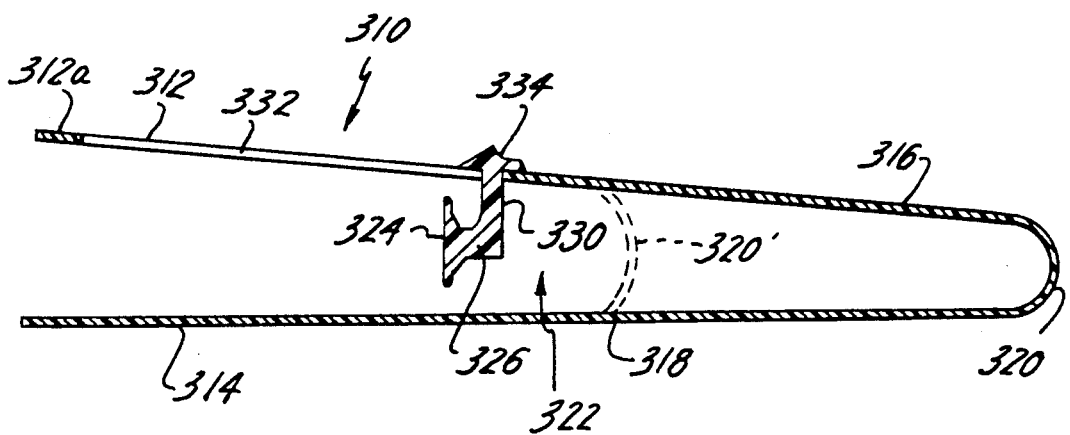
FIG. 9 is a cross-sectional view of a sandwich spatula according to another embodiment of the present invention.

Referring now to FIG. 9, a sandwich spatula 310 according to another embodiment of the present invention will now be described in which elements corresponding to the elements described above with respect to spatula 10, have been designated by the same reference numerals augmented by 300, and a detailed description of such common elements will be omitted herein for the sake of brevity. Specifically, spatula 310 eliminates guide slot 32 within upper arm 316. Instead, guide slot 332 is provided in upper plate 312 in place of and at the same position of slicing slot 19 of spatula 10, with the exception that the end 312a of plate 312 closes off the end of guide slot 332. Because of this arrangement, leg 326 is substantially shortened, and with peg 330 being slidably received within guide slot 332. Further, because of this arrangement, upper and lower arms 316 and 318 can be substantially shortened or even eliminated, as indicated by dashed lines 320'.

It will be understood that the embodiments described herein are merely exemplary and that a person skilled in the art may make many variations, combinations and modifications without departing from the spirit and scope of the invention. All such modifications and variations are intended to be included within the scope of the invention as defined in the appended claims.

What is claimed is:

1. Apparatus for inserting a sandwich into a receptacle, comprising:
    a first plate including a first guide slot therethrough;
    a second plate;
    connecting means for connecting together said first plate and said second plate in a substantially parallel, spaced relation, said connecting means including an elongated first arm having a distal end connected with said first plate, said first arm including a second guide slot therethrough, and a second elongated arm having a distal end connected with said second plate;
    securing means associated with said first and said second arms for securing together proximal ends of said first and second arms such that said first and second plates are in said substantially parallel, spaced relationship;
    biasing means associated with said first and said second arms for permitting movement of said first and second plates toward and away from each other; and
    ejector means, positioned between said first and second plates, for ejecting a sandwich from between said first plate and said second plate, said ejector means being slidably mounted to said first arm within said second guide slot.

2. Apparatus according to claim 1, wherein said ejector means includes ejector plate means positioned between said first and second plates for ejecting a sandwich from between said first plate and said second plate, peg means connected with said ejector plate means for slidably supporting said ejector means within said guide slot, and button means connected with said peg means and extending to a side of said guide slot in opposing relation to said ejector plate means for slidably moving said peg means within said guide slot to cause said ejector plate means to eject a sandwich from between said first plate and said second plate.

3. Apparatus according to claim 2, wherein said ejector plate means has a substantially planar pusher surface.

4. Apparatus according to claim 2, wherein said ejector plate means has a curved pusher surface.

5. Apparatus according to claim 2, wherein said ejector means further includes leg means for connecting said peg means to said ejector plate means.

6. Apparatus according to claim 2, wherein said ejector plate means has a width substantially equal to said first and second plate means and a height substantially equal to the height of a sandwich to be ejected.

7. Apparatus according to claim 1, further including spring means for biasing apart said first and second plates.

8. Apparatus according to claim 1, wherein said first plate has a guide slot therein, and said ejector means includes ejector plate means positioned between said first and second plates for ejecting a sandwich from between said first and second plates, peg means connected with said ejector plate means for slidably supporting with said ejector plate means for slidably supporting said ejector means within said guide slot, and button means connected with said peg means and extending to a side of said guide slot in opposing relation to said ejector plate means for slidably moving said peg means within said guide slot to cause said ejector plate means to eject a sandwich from between said first and second plates.

9. Apparatus according to claim 8, wherein said ejector plate means has a substantially planar pusher surface.

10. Apparatus according to claim 8, wherein said ejector plate means has a curved pusher surface.

11. Apparatus according to claim 8, wherein said ejector plate means has a width substantially equal to said first and second plate means and a height substantially equal to the height of a sandwich to be ejected.

12. Apparatus according to claim 1, wherein said first plate has a slot which extends partially in from an outer edge thereof for permitting cutting of a sandwich positioned between said first and second plates.

13. Apparatus according to claim 1, wherein said first and second plates are each substantially planar.

14. Apparatus according to claim 1, wherein said first and second plates each have a substantially semicylindrical configuration.

15. Apparatus for inserting a sandwich into a receptacle, comprising:
a first plate;
a second plate;
connecting means for connecting together said first plate and said second plate in a substantially parallel, spaced relation, said connecting means including a first arm connected with said first plate, a second arm connected with said second plate and securing means for securing together said first and second arms such that said first and second plates are in said substantially parallel, spaced relationship and for permitting movement of said first and second plates toward and away from each other, said first arm including a guide slot therethrough; and ejector means, positioned between said first and second plates, for ejecting a sandwich from between said first plate and said second plate, said ejector means being slidably mounted to said first arm within said guide slot, said ejector means including ejector plate means positioned between said first and second plates for ejecting a sandwich from between said first plate and said second plate, peg means connected with said ejector plate means for slidably supporting said ejector means within said guide slot, leg means for connecting said peg means to said ejector plate means, and button means connected with said peg means and extending to a side of said guide slot in opposing relation to said ejector plate means for slidably moving said peg means within said guide slot to cause said ejector plate means to eject a sandwich from between said first plate and said second plate, said leg means having a slot extending therein with a narrow entranceway and further comprising support pin means extending from said first arm and having an enlarged head which slidably rides within said slot in said leg means, for further slidably supporting said ejector means.

* * * * *